United States Patent
Kinomoto et al.

(10) Patent No.: US 6,811,251 B2
(45) Date of Patent: Nov. 2, 2004

(54) IMAGE RECORDING APPARATUS AND RECORDING METHOD BASED ON COLOR INK JET SCHEME AND INK SET

(75) Inventors: Masanori Kinomoto, Yamatokoriyama (JP); Takanori Kamoto, Nara (JP); Hiromi Nakatsu, Amagasaki (JP); Kiyofumi Morimoto, Tenri (JP); Seita Suzuki, Yamatokoriyama (JP); Ichiro Fujii, Gose (JP); Hiroaki Nakaya, Osakasayama (JP)

(73) Assignee: Sharp Kabushiki Kaisha, Osaka (JP)

( * ) Notice: Subject to any disclaimer, the term of this patent is extended or adjusted under 35 U.S.C. 154(b) by 10 days.

(21) Appl. No.: 10/428,766

(22) Filed: May 5, 2003

(65) Prior Publication Data

US 2003/0218662 A1 Nov. 27, 2003

(30) Foreign Application Priority Data

May 22, 2002 (JP) ........................ 2002-147324
May 23, 2002 (JP) ........................ 2002-149474

(51) Int. Cl.[7] ................................................. B41J 2/01
(52) U.S. Cl. ..................... 347/101; 347/100; 106/31.13
(58) Field of Search .......................... 347/95, 100, 101; 106/31.13

(56) References Cited

U.S. PATENT DOCUMENTS 5,320,897 A * 6/1994 Kondo et al. ............. 428/32.36

FOREIGN PATENT DOCUMENTS

| JP | 06-092008 | 4/1994 |
| JP | 6171072 A | * 6/1994 |
| JP | 10-330666 | 12/1998 |
| JP | 2000-144028 | 5/2000 |

* cited by examiner

*Primary Examiner*—Stephen D. Meier
*Assistant Examiner*—Ly T Tran
(74) *Attorney, Agent, or Firm*—Nixon & Vanderhye, P.C.

(57) ABSTRACT

An image recording apparatus based on a color ink-jet scheme provided with an ink set consisting of one or more than one colors of inks and a black ink and an ink-jet printing unit, wherein the initial contact angles $\theta_0$ of two colors of inks, namely, a color ink and a black ink, fall within the range from 30 to 80°, the contact angle variation Xa of the ink A as obtained by the dynamic liquid absorption measurement after the elapsed time of 1 second falls within the range $-70<Xa<-10(°)$, the dot area ratio Ya of the ink A after the elapsed time of ta seconds falls in the range $1.5<Ya$, the contact angle variation Xb of the ink B as obtained by the dynamic liquid absorption measurement after the elapsed time of 1 second falls within the range $-15<Xb<0(°)$, and the dot area ratio Yb of the ink B after the elapsed time of tb seconds falls within the range $1.0<Yb<1.7$, where printing is made first with the ink A and subsequently with the ink B.

21 Claims, 6 Drawing Sheets

| INK | A-1 | A-2 | A-3 | A-4 | B-1 | B-2 | B-3 | B-4 | B-5 |
|---|---|---|---|---|---|---|---|---|---|
| INITIAL CONTACT ANGLE (°) | 42.1 | 72.6 | 60.7 | 75.2 | 76.5 | 75.2 | 61.5 | 45.3 | 77.3 |
| DYNAMIC CONTACT ANGLE AFTER 1 SECOND | 13.9 | 34.1 | 45.2 | 68.3 | 75.8 | 65.5 | 46.2 | 17.5 | 76.1 |
| X | 28.2 | 38.5 | 15.5 | 6.9 | 0.7 | 9.7 | 15.3 | 27.8 | 1.2 |
| INITIAL DOT RADIUS (MM) | 1.4 | 1.2 | 1.2 | 1.1 | 1.1 | 1.2 | 1.4 | 1.5 | 1.1 |
| DOT RADIUS AFTER 5 SECONDS | 4.9 | 4.6 | 1.4 | 1.2 | | | | | |
| DOT RADIUS AFTER 10 SECONDS | | | | | 1.2 | 1.4 | 1.9 | 4.8 | 1.2 |
| Y | 12.25 | 14.69 | 1.36 | 1.19 | 1.19 | 1.36 | 1.84 | 10.24 | 1.19 |

FIG.1

|  | A-1 | A-2 | A-3 | A-4 |
|---|---|---|---|---|
| DYE | 3 | 3 | 3 | 3 |
| GLYCERIN | 10 | 10 | 10 | 10 |
| ETHYLENEGLYCOL DIETHYL ETHER | 10 | 5 |  |  |
| TRIETHYLENEGLYCOL MONOBUTYL ETHER |  | 3 | 5 |  |
| IPA | 1 |  |  | 1 |
| SURFYNOL 465 | 0.5 | 0.5 | 0.5 | 0.2 |
| ION-EXCHANGED WATER | REMAINDER | REMAINDER | REMAINDER | REMAINDER |

IN THE ABOVE INKS, THE COLORING MATERIALS ARE DIRECT BLUE 199, REACTIVE RED 180, AND ACID YELLOW 23.

|  | B-1 | B-2 | B-3 | B-4 | B-5 |
|---|---|---|---|---|---|
| DISPERSION LIQUID OF SELF-DISPERSING CARBON BLACK | 5 | 5 | 5 | 5 | 5 |
| GLYCERIN | 10 | 10 | 10 | 5 | 10 |
| DIETHYLENEGLYCOL |  | 3 |  | 5 |  |
| TRIETHYLENEGLYCOL MONOBUTYL ETHER | 3 | 5 | 10 | 10 | 3 |
| NMP |  |  | 10 | 5 |  |
| STYRENE-ACRYLIC ACID COPOLYMER | 5 | 5 | 5 |  |  |
| POLYESTER POLYMER |  |  |  |  |  |
| SURFYNOL 465 | 0.5 | 0.5 | 0.5 | 0.5 | 0.5 |
| ION-EXCHANGED WATER | REMAINDER | REMAINDER | REMAINDER | REMAINDER | REMAINDER |

FIG.2

| INK | A-1 | A-2 | A-3 | A-4 | B-1 | B-2 | B-3 | B-4 | B-5 |
|---|---|---|---|---|---|---|---|---|---|
| INITIAL CONTACT ANGLE (°) | 42.1 | 72.6 | 60.7 | 75.2 | 76.5 | 75.2 | 61.5 | 45.3 | 77.3 |
| DYNAMIC CONTACT ANGLE AFTER 1 SECOND | 13.9 | 34.1 | 45.2 | 68.3 | 75.8 | 65.5 | 46.2 | 17.5 | 76.1 |
| X | 28.2 | 38.5 | 15.5 | 6.9 | 0.7 | 9.7 | 15.3 | 27.8 | 1.2 |
| INITIAL DOT RADIUS (MM) | 1.4 | 1.2 | 1.2 | 1.1 | 1.1 | 1.2 | 1.4 | 1.5 | 1.1 |
| DOT RADIUS AFTER 5 SECONDS | 4.9 | 4.6 | 1.4 | 1.2 | | 1.4 | 1.9 | 4.8 | 1.2 |
| DOT RADIUS AFTER 10 SECONDS | | | | | 1.2 | | | | |
| Y | 12.25 | 14.69 | 1.36 | 1.19 | 1.19 | 1.36 | 1.84 | 10.24 | 1.19 |

FIG.3

| | EX.1-1 | EX.1-2 | EX.1-3 | EX.1-4 | COMP. EX. 1-1 | COMP. EX. 1-2 | COMP. EX. 1-3 | COMP. EX. 1-4 | COMP. EX. 1-5 | COMP. EX. 1-6 | COMP. EX. 1-7 | COMP. EX. 1-8 | COMP. EX. 1-9 |
|---|---|---|---|---|---|---|---|---|---|---|---|---|---|
| INK A | A-1 | A-1 | A-2 | A-2 | A-1 | A-1 | A-2 | A-2 | A-3 | A-3 | A-4 | A-4 | A-1 |
| INK B | B-1 | B-2 | B-1 | B-2 | B-3 | B-4 | B-3 | B-4 | B-1 | B-2 | B-1 | B-2 | B-5 |
| COLOR MIXING AND BLURRING BETWEEN A AND B | E | E | E | G | M | P | M | P | M | P | P | P | E |
| COLOR BLEED | E | E | G | G | E | E | G | G | M | M | P | P | E |
| DRYING PROPERTY | G | G | G | G | G | G | G | G | G | G | P | M | M |
| OVERALL EVALUATION | E | E | G | G | M | M | M | M | M | P | P | P | M |

FIG.4

|  | C-1 | C-2 | C-3 | C-4 | C-5 |
|---|---|---|---|---|---|
| DYE | 3 | 3 | 3 | 3 | 3 |
| GLYCERIN | 10 | 10 | 10 | 10 | 5 |
| ETHYLENEGLYCOL DIETHYL ETHER | 10 |  |  |  | 5 |
| TRIETHYLENEGLYCOL MONOBUTYL ETHER |  | 3 | 5 |  | 5 |
| IPA | 1 |  |  | 1 |  |
| SURFYNOL 465 | 0.5 | 0.5 | 0.5 | 0.2 | 0.5 |
| TERGITOL 15-S-15 |  |  |  |  |  |
| ION-EXCHANGED WATER | REMAINDER | REMAINDER | REMAINDER | REMAINDER | REMAINDER |

|  | D-1 | D-2 | D-3 | D-4 | D-5 | D-6 |
|---|---|---|---|---|---|---|
| DIRECT BLACK 19 | 3 | 3 | 3 | 3 | 3 | 3 |
| FOOD BLACK 2 |  |  |  |  |  |  |
| GLYCERIN | 10 | 10 | 10 | 5 | 10 | 10 |
| DIETHYLENEGLYCOL |  | 5 |  | 5 | 5 |  |
| TRIETHYLENEGLYCOL MONOBUTYL ETHER | 2 | 3 | 10 | 10 |  | 2 |
| NMP |  | 5 | 5 | 5 | 5 |  |
| STYRENE-ACRYLIC ACID COPOLYMER | 5 |  |  |  |  |  |
| POLYESTER POLYMER |  |  |  |  |  |  |
| SURFYNOL 465 | 0.5 | 0.5 | 0.5 | 0.5 | 0.5 | 0.5 |
| ION-EXCHANGED WATER | REMAINDER | REMAINDER | REMAINDER | REMAINDER | REMAINDER | REMAINDER |

IN THE ABOVE INKS, THE COLORING MATERIALS ARE DIRECT BLUE 199, REACTIVE RED 180, AND ACID YELLOW 23.

FIG.5

| INK | C-1 | C-2 | C-3 | C-4 | C-5 | D-1 | D-2 | D-3 | D-4 | D-5 | D-6 |
|---|---|---|---|---|---|---|---|---|---|---|---|
| INITIAL CONTACT ANGLE (°) | 42.1 | 72.6 | 60.7 | 75.2 | 65.2 | 75.5 | 74.2 | 60.5 | 44.2 | 69.7 | 77.1 |
| DYNAMIC CONTACT ANGLE AFTER 1 SECOND | 13.9 | 34.1 | 45.2 | 68.3 | 56.8 | 74.7 | 64.3 | 44.3 | 16.8 | 61.1 | 75.7 |
| X | -28.2 | -38.5 | -15.5 | -6.9 | -8.4 | -0.8 | -9.9 | -16.2 | -27.4 | -8.6 | -1.4 |
| INITIAL DOT RADIUS (MM) | 1.4 | 1.2 | 1.2 | 1.1 | 1.2 | 1.1 | 1.1 | 1.4 | 1.5 | 1.1 | 1.1 |
| DOT RADIUS AFTER 5 SECONDS | 4.9 | 4.6 | 1.4 | 1.2 | 1.8 | | 1.3 | 1.9 | 4.9 | 2.6 | 1.2 |
| DOT RADIUS AFTER 10 SECONDS | | | | | | 1.2 | | | | | |
| Y | 12.25 | 14.69 | 1.36 | 1.19 | 2.25 | 1.19 | 1.40 | 1.84 | 10.67 | 5.59 | 1.19 |

FIG.6

| | EX.2-1 | EX.2-2 | EX.2-3 | EX.2-4 | EX.2-5 | COMP. EX. 2-1 | COMP. EX. 2-2 | COMP. EX. 2-3 | COMP. EX. 2-4 | COMP. EX. 2-5 | COMP. EX. 2-6 | COMP. EX. 2-7 | COMP. EX. 2-8 | COMP. EX. 2-9 | COMP. EX. 2-10 |
|---|---|---|---|---|---|---|---|---|---|---|---|---|---|---|---|
| INK C | C-1 | C-1 | C-2 | C-2 | C-1 | C-1 | C-1 | C-2 | C-2 | C-3 | C-3 | C-4 | C-4 | C-5 | C-1 |
| INK D | D-1 | D-2 | D-1 | D-2 | D-6 | D-3 | D-4 | D-3 | D-4 | D-1 | D-2 | D-1 | D-2 | D-1 | D-5 |
| COLOR MIXING AND BLURRING BETWEEN C AND D | E | E | E | G | E | M | P | M | P | M | P | P | P | P | M |
| IMAGE BLURRING | E | E | G | G | E | E | E | G | G | M | M | P | P | P | E |
| DRYING PROPERTY | G | G | G | G | M | G | G | G | G | G | G | P | M | P | M |
| OVERALL EVALUATION | E | E | G | G | G | M | M | M | M | M | P | P | P | P | M |

IMAGE RECORDING APPARATUS AND RECORDING METHOD BASED ON COLOR INK JET SCHEME AND INK SET

BACKGROUND OF THE INVENTION

The present invention is an image recording apparatus and a recording method based on a color ink-jet scheme and an ink set, and relates to a color image recording method; more specifically, an image recording method based on a color ink-jet scheme, and an ink set for use in the ink-jet recording which can achieve the reproduction of brilliant colors with scarce color bleed and is low in blurring, when an image to be recorded is recorded on a sheet of a plain paper.

DESCRIPTION OF THE RELATED ART

In the recent ink-jet recording techniques, with the development of the manufacturing methods of the heads having a highly-integrated and high-precision nozzle, it has become possible to make high speed printing of high resolution images by discharging fine ink droplets. Particularly, with a medium provided with an ink accepting layer on the surface thereof as a quality paper special for ink-jet printing, it is possible to record an image as high in quality as a silver salt photograph. However, even with the recent techniques of ink-jet recording, the images recorded on the plain papers tend to be degraded in quality; there has not been solved the problem that on a plain paper, the color blurring and color mixing (bleeding) occur conspicuously in the boundaries between the adjacent ink dots.

Japanese Patent Laid-Open No. 6-92008 proposes the use of an ink which is 40° or smaller in the contact angle at the elapsed time of 5 seconds after dropping on a paper subjected to sizing, and contains at least acetyleneglycol; however, in the actual ink-jet recording, the ink droplet is dried very fast, so the validity of the property specification made solely on the basis of the contact angle measured at the elapsed time of 5 seconds after dropping is questionable.

Japanese Patent Laid-Open No. 10-330666 proposes an ink in which for a recording medium with a sizing degree of 10 seconds or longer, the advanced contact angle is 40° to 70° at the wetting time of 0.2 second or shorter as measured by Bristow's method; however, the wetting time based on Bristow's method refers to the irregularity of the paper surface, and hence to a macroscopic measure of the penetration of ink, so that it is different from the penetration of the ultra-fine ink droplets in the contemporary ink-jet recording, and accordingly the relation between the ink blurring and the high speed printing remains still unclear.

Japanese Patent Laid-Open No. 2000-144028 proposes a pigment ink in which the time variation of the dynamic contact angle on a plain paper is 0.5 to 3.5°/second; however, the ink cannot avoid the color mixing because the penetration of the ink is considerably slow.

As described above, there are proposed a variety of inks and methods for use in the ink-jet recording and for the purpose of suppressing the blurring and color mixing of inks, but the suppression of the blurring and color mixing on plain papers is not sufficiently satisfactory, so that the images become as a whole fuzzy when printed, and no fine images can be obtained. The state of affairs is that the recent ink-jet recording seeks for a higher quality and high speed recording, and a technique capable of the finer suppression of the blurring and color mixing is required, but it is still the case that there has not yet been developed an ink and a method which can meet these requirements.

SUMMARY OF THE INVENTION

Accordingly, the present invention takes as its object the provision of an image recording apparatus and a recording method based on a color ink-jet scheme and an ink set which can achieve the reproduction of brilliant colors with scarce color bleed and is low in blurring even in a high speed recording on plain papers when the ink set is used as the inks for use in the ink-jet recording.

As a result of diligent study for the purpose of overcoming the above described problems, the present inventors have come to perfect the present invention, by discovering that there can be obtained an ink set for use in the ink-jet recording which can achieve the reproduction of brilliant colors with scarce color bleed and is low in blurring, by regulating the dynamic contact angle variations and the dot radius variation rates of the ink A and ink B, where printing is performed first with ink A and subsequently with ink B.

More specifically, the present invention is an image recording apparatus based on a color ink-jet scheme provided with an ink set consisting of one or more than one colors of inks containing a color dye and water as the indispensable components and a black ink containing a black pigment and water as the indispensable components, and an ink-jet printing unit which makes printing with these inks on such plain papers as having a degree of flatness and smoothness of 100 seconds or less, wherein the initial contact angles $\theta_0$ of the two colors of inks, namely, at least one color ink and the black ink of the above described ink set, fall within the range from 30 to 80° on a plain paper having a degree of flatness and smoothness of 100 seconds or less; as for one of the two colors of inks, the ink A, and the other ink, the ink B, the contact angle variation Xa of the ink A as obtained by the dynamic liquid absorption measurement after the elapsed time of 1 second falls within the range $-70<Xa<-10(°)$, the dot area ratio Ya of the ink A after the elapsed time of ta seconds falls in the range $1.5<Ya$, the contact angle variation Xb of the ink B as obtained by the dynamic liquid absorption measurement after the elapsed time of 1 second falls within the range $-10<Xb<0(°)$, and the dot area ratio Yb of the ink B after the elapsed time of tb seconds falls within the range $1.0<Yb<1.5$; and the ink-jet printing unit makes printing first with the ink A and subsequently with the ink B. Here, the contact angle variation $X=\theta-\theta_0$, the dot area ratio $Y=r_t^2/r_0^2$, $0.1<ta \leq 5$ (seconds), $0<tb \leq 10$ (seconds), $\theta$ denotes the dynamic contact angle of the ink A or the ink B after the elapsed time of 1 second from the printing, and $r_0$ and $r_t$ denote respectively the radii of the dots at the time of printing with the ink A or the ink B and after the elapsed time of ta or tb seconds therefrom. Incidentally, the liquid droplet volume in the dynamic liquid absorption measurement is 2 µL.

Additionally, the present invention is an image recording apparatus based on a color ink-jet scheme, wherein in the above described ink set, the black pigment in the black ink is a self-dispersing pigment.

Besides, the present invention is an image recording apparatus based on a color ink-jet scheme, wherein in the above described ink set, at least one color of ink contains at least any one of a polyol or a polyol ether.

Furthermore, the present invention is an image recording apparatus based on a color ink-jet scheme, wherein the above described polyol or polyol ether is selected from the group consisting of ethyleneglycol monoalkyl ethers, diethyleneglycol monoalkyl ethers, triethyleneglycol monoalkyl ethers, propyleneglycol monoalkyl ethers, dipropyleneglycol monoalkyl ethers, and alkoxy substituted aliphatic alcohol.

Additionally, the present invention is an image recording apparatus based on a color ink-jet scheme, wherein in the above described ink set, at least one color of ink contains a glycol based or an acetylenegylcol based surfactant.

Besides, the present invention is an image recording apparatus based on a color ink-jet scheme, wherein in the above described ink set, the surface tension of at least one color of ink falls within the range from 20 to 70 mN/m.

Furthermore, the present invention is an image recording apparatus based on a color ink-jet scheme, wherein in the above described ink set, the viscosity of at least one color of ink falls within the range from 1 to 20 mPa.S.

Additionally, the present invention is an image recording apparatus based on a color ink-jet scheme, wherein in the above described ink set, at least one color of ink contains as the fixing resin a water-soluble resin and/or an emulsion and/or a latex.

Besides, the present invention is an image recording apparatus based on a color ink-jet scheme, wherein in the above described ink set, the ink A is a color ink and the ink B is a black ink.

Furthermore, the present invention is an image recording apparatus based on a color ink-jet scheme provided with an ink set consisting of one or more than one colors of inks containing a color dye and water as the indispensable components and a black ink containing a black dye and water as the indispensable components, and an ink-jet printing unit which makes printing with these inks on such plain papers as having a degree of flatness and smoothness of 100 seconds or less, wherein the initial contact angles $\theta_0$ of the two colors of inks, namely, at least one color ink and the black ink of the above described ink set, fall within the range from 30 to 80° on a plain paper having a degree of flatness and smoothness of 100 seconds or less; as for one of the two colors of inks, the ink C, and the other ink, the ink D, the contact angle variation Xc of the ink C as obtained by the dynamic liquid absorption measurement after the elapsed time of I second falls within the range $-70<Xc<-10(°)$, the dot area ratio Yc of the ink C after the elapsed time of tc seconds falls in the range 1.5<Yc, the contact angle variation Xd of the ink D as obtained by the dynamic liquid absorption measurement after the elapsed time of 1 second falls within the range $-15<Xd<0(°)$, and the dot area ratio Yd of the ink D after the elapsed time of td seconds falls within the range 1.0<Yd<1.7; and the ink-jet printing unit performs printing first with the ink C and subsequently with the ink D. Here, the contact angle variation $X=\theta-\theta_0$, the dot area ratio $Y=r_t^2/r_0^2$, 0<tc≦5 (seconds), 0<td≦10 (seconds), $\theta$ denotes the dynamic contact angle of the ink C or the ink D after the elapsed time of 1 second from the printing, and $r_0$ and $r_t$ denote respectively the radii of the dots at the time of printing with the ink C or the ink D and after the elapsed time of tc or td seconds therefrom. Incidentally, the liquid droplet volume in the dynamic liquid absorption measurement is 2 $\mu$L.

Additionally, the present invention is an image recording apparatus based on a color ink-jet scheme, wherein in the above described ink set, at least one color of ink contains at least any one of a polyol or a polyol ether.

Further, the present invention is an image recording apparatus based on a color ink-jet scheme, wherein the above described polyol or polyol ether is selected from the group consisting of ethyleneglycol monoalkyl ethers, diethyleneglycol monoalkyl ethers, triethyleneglycol monoalkyl ethers, propyleneglycol monoalkyl ethers, dipropyleneglycol monoalkyl ethers, and alkoxy substituted aliphatic alcohol.

Furthermore, the present invention is an image recording apparatus based on a color ink-jet scheme, wherein in the above described ink set, at least one color of ink contains a glycol based or an acetylenegylcol based surfactant.

Additionally, the present invention is an image recording apparatus based on a color ink-jet scheme, wherein in the above described ink set, the surface tension of at least one color of ink falls within the range from 20 to 70 mN/m.

Further, the present invention is an image recording apparatus based on a color ink-jet scheme, wherein in the above described ink set, the viscosity of at least one color of ink falls within the range from 1 to 20 mPa.S.

Furthermore, the present invention is an image recording apparatus based on a color ink-jet scheme, wherein in the above described ink set, at least one color of ink contains as the fixing resin a water-soluble resin and/or an emulsion and/or a latex.

Additionally, the present invention is an image recording apparatus based on a color ink-jet scheme, wherein in the above described ink set, the ink C is a color ink and the ink D is a black ink.

The present invention is an image recording method based on a color ink-jet scheme which performs printing in the ink-jet scheme on such plain papers as having a degree of flatness and smoothness of 100 seconds or less, with one or more than one colors of inks containing a color dye and water as the indispensable components and a black ink containing a black pigment and water as the indispensable components, wherein the initial contact angles $\theta_0$ of the two colors of inks, namely, at least one color ink and the black ink, fall within the range from 30 to 80° on a plain paper having a degree of flatness and smoothness of 100 seconds or less; as for one of the two colors of inks, the ink E, and the other ink, the ink F, the contact angle variation Xe of the ink E as obtained by the dynamic liquid absorption measurement after the elapsed time of 1 second falls within the range $-70<Xe<-10(°)$, the dot area ratio Ye of the ink E after the elapsed time of te seconds falls in the range 1.5<Ye, the contact angle variation Xf of the ink F as obtained by the dynamic liquid absorption measurement after the elapsed time of 1 second falls within the range $-10<Xf<0(°)$, and the dot area ratio Yf of the ink F after the elapsed time of tf seconds falls within the range 1.0<Yf<1.5; and printing is performed first with the ink E and subsequently with the ink F. Here, the contact angle variation $X=\theta-\theta_0$, the dot area ratio $Y=r_t^2/r_0^2$, 0.1 <te≦5 (seconds), 0<tf≦10 (seconds), $\theta$ denotes the dynamic contact angle of the ink E or the ink F after the elapsed time of 1 second from the printing, and $r_0$ and $r_t$ denote respectively the radii of the dots at the time of printing with the ink E or the ink F and after the elapsed time of te or tf seconds therefrom. Incidentally, the liquid droplet volume in the dynamic liquid absorption measurement is 2 $\mu$L.

Furthermore, the present invention is an image recording method based on a color ink-jet scheme which performs printing in the ink-jet scheme on such plain papers as having a degree of flatness and smoothness of 100 seconds or less, with one or more than one colors of inks containing a color dye and water as the indispensable components and a black ink containing a black dye and water as the indispensable components, wherein the initial contact angles $\theta_0$ of the two colors of inks, namely, at least one color ink and the black ink, fall within the range from 30 to 80° on a plain paper having a degree of flatness and smoothness of 100 seconds or less; as for one of the two colors of inks, the ink G, and the other ink, the ink H, the contact angle variation Xg of the ink G as obtained by the dynamic liquid absorption measurement after the elapsed time of 1 second falls within the range $-70<Xg<-10(°)$, the dot area ratio Yg of the ink G after the elapsed time of tg seconds falls in the range $1.5<Yg$, the contact angle variation Xh of the ink H as obtained by the dynamic liquid absorption measurement after the elapsed time of 1 second falls within the range $-15<Xh<0(°)$, and the dot area ratio Yh of the ink F after the elapsed time of th seconds falls within the range $1.0<Yh<1.7$; and printing is performed first with the ink G and subsequently with the ink H. Here, the contact angle variation $X=\theta-\theta_0$, the dot area ratio $Y=r_t^2/r_0^2$, $0<tg\leq 5$ (seconds), $0<th\leq 10$ (seconds), $\theta$ denotes the dynamic contact angle of the ink G or the ink H after the elapsed time of 1 second from the printing, and $r_0$ and $r_t$ denote respectively the radii of the dots at the time of printing with the ink G or the ink H and after the elapsed time of tg or th seconds therefrom. Incidentally, the liquid droplet volume in the dynamic liquid absorption measurement is 2 $\mu$L.

Additionally, the present invention is an ink set for use in the ink-jet recording which is composed of a combination of one or more than one colors of inks containing a color dye and water as the indispensable components and a black ink containing a black pigment and water as the indispensable components, wherein the initial contact angles $\theta_0$ of the two colors of inks, namely, at least one color ink I and the black ink J, fall within the range from 30 to 80° on a plain paper having a degree of flatness and smoothness of 100 seconds or less; and the contact angle variation Xi of the color ink I as obtained by the dynamic liquid absorption measurement after the elapsed time of 1 second falls within the range $-70<Xi<-10(°)$, the dot area ratio Yi of the color ink I after the elapsed time of ti seconds falls in the range $1.5<Yi$, the contact angle variation Xj of the black ink J as obtained by the dynamic liquid absorption measurement after the elapsed time of 1 second falls within the range $-10<Xj<0(°)$, and the dot area ratio Yj of the black ink J after the elapsed time of tj seconds falls within the range $1.0<Yj<1.5$. Here, the contact angle variation $X=\theta-\theta_0$, the dot area ratio $Y=r_t^2/r_0^2$, $0.1<ti\leq 5$ (seconds), $0<tj\leq 10$ (seconds), $\theta$ denotes the dynamic contact angle of the color ink I or the black ink J after the elapsed time of 1 second from the printing, and $r_0$ and $r_t$ denote respectively the radii of the dots at the time of printing with the color ink I or the black ink J and after the elapsed time of ti or tj seconds therefrom. Incidentally, the liquid droplet volume in the dynamic liquid absorption measurement is 2 $\mu$L.

Besides, the present invention is an ink set for use in the ink-jet recording which is composed of a combination of one or more than one colors of inks containing a color dye and water as the indispensable components and a black ink containing a black dye and water as the indispensable components, wherein the initial contact angles $\theta_0$ of the two colors of inks, namely, at least one color ink K and the black ink L, fall within the range from 30 to 80° on a plain paper having a degree of flatness and smoothness of 100 seconds or less; and the contact angle variation Xk of the color ink K as obtained by the dynamic liquid absorption measurement after the elapsed time of 1 second falls within the range $-70<Xk<-10(°)$, the dot area ratio Yk of the color ink K after the elapsed time of tk seconds falls in the range $1.5<Yk$, the contact angle variation Xl of the black ink L as obtained by the dynamic liquid absorption measurement after the elapsed time of 1 second falls within the range $-15<Xl<0(°)$, and the dot area ratio Yl of the ink L after the elapsed time of tl seconds falls within the range $1.0<Yl<1.7$. Here, the contact angle variation $X=\theta-\theta_0$, the dot area ratio $Y=r_t^2/r_0^2$, $0<tk\leq 5$ (seconds), $0<tl\leq 10$ (seconds), $\theta$ denotes the dynamic contact angle of the color ink K or the black ink L after the elapsed time of 1 second from the printing, and $r_0$ and $r_t$ denote respectively the radii of the dots at the time of printing with the color ink K or the black ink L and after the elapsed time of tk or tl seconds therefrom. Incidentally, the liquid droplet volume in the dynamic liquid absorption measurement is 2 $\mu$L.

BRIEF DESCRIPTION OF THE DRAWINGS

FIG. 1 is a diagram describing the raw materials for the inks used in Examples and Comparative Examples in the present invention 1;

FIG. 2 is a diagram describing the characteristics of the inks used in Examples and Comparative Examples in the present invention 1;

FIG. 3 is a diagram describing the evaluation of the ink sets in Examples and Comparative Examples in the present invention 1;

FIG. 4 is a diagram describing the raw materials for the inks used in Examples and Comparative Examples in the present invention 2;

FIG. 5 is a diagram describing the characteristics of the inks used in Examples and Comparative Examples in the present invention 2; and FIG. 6 is a diagram describing the evaluation of the ink sets in Examples and Comparative Examples in the present invention 2.

DETAILED DESCRIPTION OF THE PREFERRED EMBODIMENTS

Description is made on the embodiments of the present invention.

The image recording apparatus based on a color ink-jet scheme of the present invention 1 is provided with an ink set and an ink-jet printing unit, and the ink set is composed of a combination of one or more than one colors of inks containing a color dye and water as the indispensable components and a black ink containing a black pigment and water as the indispensable components. As for the color inks and black ink, the contact angle $\theta$ and the dot radius r of an ink can be adjusted by adding a surfactant and a water-soluble organic solvent; for one of the ink, the ink A, the contact angle variation X (see the formula 1 shown below) after the elapsed time of 1 second as measured by the dynamic liquid absorption measurement falls preferably within the range $-70<Xa<-10(°)$, more preferably within the range $-50<Xa<-20(°)$, and the dot area ratio Ya (see the formula 2 shown below) after the elapsed time of ta seconds satisfying the relation $0.1<ta\leq 5$ (seconds) falls preferably in the range $1.5<Ya$, more preferably in the range $5.0<Ya$. The larger is the contact angle variation Xa of an ink, the smaller the initial contact angle of the ink tends to become, and hence it is difficult to prepare an ink with Xa smaller than the above described lower limit, and when Xa exceeds the above described upper limit, the penetration of the ink into plain papers becomes slow, which causes color mixing.

As for the other ink, the ink B, the contact angle variation Xb (see the formula 1 shown below) as measured by the dynamic liquid absorption measurement preferably falls within the range $-10<Xb<0(°)$, more preferably within the range $-7<Xb<0(°)$, and the dot area ratio Yb (see formula 2 shown below) after the elapsed time of tb seconds satisfying the relation $0<tb\leq 10$ (seconds) falls preferably within the range $1.0<Yb<1.5$, more preferably within the range 1.0

<Yb<1.4. If the contact angle variation Xb becomes smaller than the above described lower limit, or the dot area ratio Yb exceeds the above described upper limit, the penetration of the ink becomes fast, which causes color mixing with the ink A printed in advance.

The image recording apparatus based on a color ink-jet scheme of the present invention 2 is provided with an ink set and an ink-jet printing unit, and the ink set is composed of a combination of one or more than one colors of inks containing a color dye and water as the indispensable components and a black ink containing a black dye and water as the indispensable components. As for the color inks and black ink, the contact angle θ and the dot radius r of an ink can be adjusted by adding a surfactant and a water-soluble organic solvent; for one of the ink, the ink C, the contact angle variation X (see the formula 1 shown below) after the elapsed time of 1 second as measured by the dynamic liquid absorption measurement falls preferably within the range $-70<Xc<-10(°)$, more preferably within the range $-50<Xc<-20(°)$, and the dot area ratio Yc (see the formula 2 shown below) after the elapsed time of tc seconds satisfying the relation $0.1<tc\leq5$ (seconds) falls preferably in the range $1.5<Yc$, more preferably in the range $5.0<Yc$. The larger is the contact angle variation Xc of an ink, the smaller the initial contact angle of the ink tends to become, and hence it is difficult to prepare an ink with Xc smaller than the above described lower limit, and when Xc exceeds the above described upper limit, the penetration of the ink into plain papers becomes slow, which causes color mixing.

As for the other ink, the ink D, the contact angle variation Xd (see the formula 1 shown below) as measured by the dynamic liquid absorption measurement preferably falls within the range $-15<Xd<0(°)$, more preferably within the range $-10<Xd<0(°)$, and the dot area ratio Yd (see formula 2 shown below) after the elapsed time of td seconds satisfying the relation $0<td\leq10$ (seconds) falls preferably within the range $1.0<Yd<1.7$, more preferably within the range $1.0<Yd<1.5$. If the contact angle variation Xd becomes smaller than the above described lower limit, or the dot area ratio Yd exceeds the above described upper limit, the penetration of the ink becomes fast, which causes color mixing with the ink C printed in advance.

Incidentally, the above mentioned formula 1 is the expression that the contact angle variation $X=\theta-\theta_0$, and the above mentioned formula 2 is the expression that the dot area ratio $Y=r_t^2/r_0^2$. Here, $\theta_0$ and $\theta$ represent respectively the dynamic contact angles at the time of printing (initial contact angles) and at the elapsed time of 1 second from the printing, and $r_0$ and $r_t$ respectively represent the dot radii at the time of printing and at the elapsed time of t seconds therefrom. It should be noted that these quantities refer to the measurements on a plain paper having the degree of flatness and smoothness of 100 seconds or lower, and the liquid droplet volume in the dynamic liquid absorption measurement is 2 μL.

The ink-jet printing units in the image recording apparatuses based on a color ink-jet scheme of the present inventions 1 and 2 perform printing first with the ink A or C and subsequently with the ink B or D on a plain paper having a degree of flatness and smoothness of 100 seconds or less.

In the image recording apparatuses and recording methods based on a color ink-jet scheme in the present inventions 1 and 2, when a droplet of an ink is shot and arrives at a recording medium, and before the next droplet of another ink, adjacent to or having an overlap with the precedent ink droplet, is shot and arrives at a recording medium, the ink droplet precedently shot and having arrived at the recording medium is made to wholly penetrate into the recording medium, and thus the color mixing of the inks can be prevented; by making the image formation on the basis of the ink-jet recording method which uses inks or an ink set having the contact angles and area variation rates so constrained that the transverse blurring of the inks ascribable to too high speed of penetration does not occur; and thus clear images free from the blurring and color mixing of the inks can be obtained on plain papers, and the image printing time can also be reduced to the fullest extent.

Adoption of the ink-jet recording schemes of the present inventions 1 and 2 successfully yields the effect that clear images free from the blurring and color mixing can be obtained on plain papers with high speed printing.

We will now describe the coloring materials and the recording liquids dispersing or dissolving the coloring materials used in the image recording apparatuses and recording methods based on a color ink-jet scheme and the ink sets of the present inventions 1 and 2. The coloring water-soluble dyes used as the coloring materials include acid dyes, direct dyes, basic dyes, reactive dyes, food dyes, and the like. These dyes can be used as the mixtures thereof according to need, and are added within the ranges in which the effect is not inhibited. The specific examples of these dyes which can be used include:

as the acid dyes and food dyes,

C.I. Acid Yellow 17, 23, 42, 44, 79, 142;

C.I. Acid Red 1, 8, 13, 14, 18, 26, 27, 35, 37, 42, 52, 82, 87, 89, 92, 97, 106, 111, 114, 115, 134, 186, 249, 254, 289;

C.I. Acid Blue 9, 29, 45, 92, 249;

C.I. Food Yellow 3, 4;

C.I. Food Red 7, 9, 14;

as the direct dyes,

C.I. Direct Yellow 11, 12, 24, 26, 33, 44, 50, 86, 120, 132, 142, 144;

C.I. Direct Red 1, 4, 9, 13, 17, 20, 28, 31, 39, 80, 81, 83, 89, 225, 227;

C.I. Direct Orange 26, 29, 62, 102;

C.I. Direct Blue 1, 2, 6, 15, 22, 25, 71, 76, 79, 86, 87, 90, 98, 163, 165, 199, 202;

as the basic dyes,

C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91;

C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112;

C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155;

as the reactive dyes,

C.I. Reactive Yellow 1, 5, 11, 13, 14, 20, 21, 22, 25, 40, 47, 51, 55, 65, 67;

C.I. Reactive Red 1, 14, 17, 25, 26, 32, 37, 44, 46, 55, 60, 66, 74, 79, 96, 97;

C.I. Reactive Blue 1, 2, 7, 14, 15, 23, 32, 35, 38, 41, 63, 80, 95.

As the black pigments used in the present invention 1, the carbon black used in black ink is generally used, and there is preferably cited a self-dispersing carbon black which is charged and dispersed in water. Specifically, there can be obtained a pigment self-dispersible in water by treating carbon black with the surface modification treatments such as the acid/base treatment, coupling agent treatment, polymer graft treatment, plasma treatment, oxidation/reduction treatment, and the like. In addition to such pigments as subjected to the above described surface modification treatments, the following commercially available pigments and the like can be used: Cab-o-jet-200, Cab-o-jet-300, and IJX-55 manufactured by Cabot Corp.; Micro jet Black CW-1 manufactured by Orient Chemical Industries, Ltd.; and the pigments offered commercially by Nippon Shokubai Co., Ltd.

In the image recording apparatus and recording method based on a color ink-jet scheme and the ink set in the present invention 2, in addition to the above described dyes, the following dyes and the like can be used:

as the acid dyes and food dyes,

C.I. Acid Black 1, 2, 7, 16, 17, 24, 26, 28, 31, 41, 48, 52, 58, 60, 63, 94, 107, 109, 112, 118, 119, 121, 122, 131, 155, 156;

C.I. Food Black 1, 2;

as the direct dyes,

C.I. Direct Black 2, 4, 9, 11, 14, 17, 19, 22, 27, 32, 36, 41, 48, 51, 56, 62, 71, 74, 75, 77, 78, 80, 105, 106, 107, 108, 112, 113, 117, 132, 146, 154, 168, 171, 194;

as the basic dyes,

C.I. Basic Black 2, 8;

as the reactive dyes,

C.I. Reactive Black 1, 3, 5, 6, 8, 12, 14.

The content of the coloring material used in the ink-jet recording liquid in any of the present inventions 1 and 2 is preferably 0.5 to 20.0 wt %, more preferably 1.0 to 10.0 wt % in relation to the weight of the ink-jet recording liquid. With the content of the coloring material smaller than 0.5 wt %, no sufficient image density can be obtained, while with the content of the coloring material exceeding 20.0 wt %, the image fixability is degraded in some cases.

Further, in the ink-jet recording liquid in any of the present inventions 1 and 2, a plurality of the following water-soluble organic solvents may be used, for the purposes of obtaining the desired physical characteristics, preventing the recording liquid from drying, and improving the dissolution stability. Specifically the following solvents and the like may be used each alone or in combinations thereof: the polyols including ethyleneglycol, diethyleneglycol, triethyleneglycol, polyethyleneglycol, polypropyleneglycol, 1,5-pentanediol, 1,6-hexanediol, glycerin, 1,2,6-hexanetriol, 1,2,4-butanetriol, 1,2,3-butanetriol, petriol, and the like; the polyol monoalkyl ethers including ethyleneglycol monoethyl ether, ethyleneglycol monobutyl ether, diethyleneglycol monomethyl ether, diethyleneglycol monoethyl ether, diethyleneglycol monobutyl ether, tetraethyleneglycol monomethyl ether, propyleneglycol monoethyl ether, and the like; the polyol aryl ethers including ethyleneglycol monophenyl ether, ethyleneglycol monobenzyl ether, and the like; the nitrogen-containing heterocyclic compounds including N-methyl-2-pyrrolidone, N-hydroxyethyl-2-pyrrolidone, 2-pyrrolidone, 1,3-dimethylimidazolidinone, ε-caprolactam, and the like; the amides including formamide, N-memthylformadie, formamide, N,N-dimethylformamide, and the like; the amines including monoethanolamine, diethanolamine, triethanolamine, monoethylamine, diethylamine, triethylamine, and the like; the sulfur-containing compounds including dimethylsulfoxide, sulfolane, thiodiethanol, ethylene urea, urea, and the like; and propylene carbonate, ethylene carbonate, γ-butyrolactone, and the like.

The polymer dispersants and binders which can be used in the present inventions 1 and 2 include the proteins such as gelatin, albumin, casein, and the like; the natural rubbers such as gum arabic and the like; the glucosides such as sabonin and the like; the natural polymers such as lignin sulfonate, shellac and the like; and polyurethane resin, polyester resin, epoxy resin, acrylic resin, and the like. These substances may be used each alone or in combination of a plurality thereof.

From the viewpoint of the discharge performance of the recording liquid for use in ink jet in the image recording apparatus based on a color ink-jet scheme in any of the present inventions 1 and 2, the surface tension of the recording liquid is preferably 20 to 70 mN/m, more preferably 25 to 45 mN/m. For the purpose of controlling the penetrability into recording media, it is possible to add a surfactant. It is preferable that the added surfactant is satisfactory in mutual solubility with the other components in the recording liquid, and among surfactants a surfactant high in penetrability and stability is particularly preferable. As specific examples of such surfactants, nonionic surfactants can be cited. As the nonionic surfactants, there can be cited: the polyoxyethylene based surfactants; the polyoxypropylene based surfactants; the poly(oxyethylene-oxypropylene) based surfactants; the polyoxyacetylene based surfactants; the ether based surfactants including polyoxyethylene nonylphenyl ether, polyoxyethylene alkylaryl ethers, polyoxyethylene oleyl ether, polyoxyethylene lauryl ether, polyoxyethylene alkyl ether, polyoxyalkylene alkyl ether, and the like; the ester based surfactants including polyoxyethylene oleic acid, polyoxyethylene oleate, polyoxyethylene distearate, sorbitane laurate, sorbitane monostearate, sorbitane monooleate, polyoxyethylene stearate, and the like; and the fluorine containing surfactants including fluoroalkyl ester, perfluoroalkyl carboxylate, and the like.

Furthermore, from the viewpoint of the discharge performance of the recording liquid for use in ink jet in the image recording apparatus based on a color ink-jet scheme in any of the present inventions 1 and 2, the viscosity of the recording liquid is preferably 1.0 to 10.0 mPa.S, and it is possible to add a hydrophilic polymer compound for the purpose of adjusting the viscosity. As such hydrophilic polymer compounds, there can be cited the following polymer compounds and the like:

as the natural polymers, the plant based polymers including gum arabic, tragan gum, guar gum, karaya gum, locust bean gum, arabinogalacton, pectin, quince seed starch, and the like; the seaweed based polymers including alginic acid, carrageenan, agar, and the like; the animal based polymers including gelatin, casein, albumin, collagen, and the like; the microorganism based polymers including xanthane gum, dextran, and the like; and shellac;

as the semi-synthetic polymers, the fibrin based polymers including methylcellulose, ethylcellulose, hydorxyethylcellulose, hydorxypropylcellulose, carboxymethylcellulose, and the like; the starch based polymers including sodium starch glycolate, sodium starch phosphate, and the like; the sea weed based polymers including sodium alginate, propyleneglycol alginate, and the like; and as the purely synthetic polymers, the vinyl based polymers including polyvinyl alcohol, polyvinyl pyrrolidone, polyvinyl methyl ether, and the like; the acryl based resins including non-crosslinked polyacrylamide, polyacrylic acid and the alkali metal salts thereof, water-soluble styrene-acryl resin, and the like; water soluble styrene maleic acid resin; water soluble vinylnaphthalene acrylic resin; water-soluble vinylnaphthalene maleic acid resin; polyvinyl pyrrolidone; polyvinyl alcohol; alkali metal salts of β-naphthalenesulfonic acid-formaldehyde condensate; the polymer compounds with the side chains having cationic functional groups such as quarternary ammonium, amino groups, and the like.

Additionally, the conventionally known additives for use in the recording liquids can be added to the ink-jet recording liquids in the present inventions 1 and 2. For example, as the antiseptic and antimold agents, the following agents can be used: sodium dehydroacetate, sodium sorbate, sodium 2-pyridinethiol-1-oxide, sodium benzoate, sodium pentachlorophenolate, and the like. As the pH adjuster, there can be used any substance as far as it does not give any adverse effect on the prepared ink and can adjust the pH to be 7 or higher. As such specific examples there can be cited the following substances: the amines including diethanolamine, triethanolamine, and the like; the hydroxides of the alkali metal elements including lithium hydroxide, sodium hydroxide, potassium hydroxide, and the like; the alkali metal carbonates and the like including ammonium hydroxide, quaternary ammonium hydroxide, quaternary phosphonium hydroxide, lithium carbonate, sodium carbonate, potassium carbonate, and the like. As the chelating reagents, there can be cited, for example, the following substances: sodium ethylenediamine tetraacetate, sodium nitrilotriacetate, sodium hydroxyethylethylenediamine triacetate, sodium diethylenetriamine petaacetate, sodium uramildiacetate, and the like. As the antirust agents, there can be cited, for example, the following substances: acid sulfite, sodium thiosulfate, ammonium thiodiglycollate, diisopropyrlammonium nitrite, pentaterythritol tetranitrate, dicyclohexylammonium nitrite, and the like. In addition to the above described substances, according to the purpose, the following substances can also be added: a water-soluble ultraviolet absorbing agent, a water-soluble infrared absorbing agent, a dissolution aid, an antioxidant, and the like.

Next, specific description is made on the present inventions 1 and 2, with reference to Examples and Comparative Examples, but the present invention is not limited to these Examples. In the first place, the compositions of the inks used in Examples and Comparative Examples of the present invention 1 are shown below. First, the values given in % are represented in terms of the weights. Additionally, as for the compositions, the types and addition amounts of the dyes, pigments, solvents, and additives are as shown in FIG. 1; ion-exchanged water was added as the remainder so as to make the total quantity be 100. Incidentally, the inks A-1 to A-4 are the cyan-magenta-yellow color inks, where the used dyes are Direct Blue 199, Reactive Red 180, and Acid Yellow 23. The inks B-1 to B-6 are black inks, where a self-dispersing carbon black was used.

Each of the inks A-1 to A-4 was prepared as follows: the individual components of the ink shown in FIG. 1 were mixed, and stirred and mixed together at 25° C. for 1 hour, and then the mixture was subjected to the pressurized filtration with a membrane filter of 1.2 μm and to the degassing treatment.

The inks thus obtained were subjected to the dynamic contact angle measurement on a plain paper, Sharp NM4A2S, to obtain the initial contact angles and dot radii, and the time variations of the contact angles and dot radii after certain elapsed times, and the results obtained are shown in FIG. 2. Incidentally, the dynamic contact angle measurement was performed as follows: in an environment of 25° C. and 60% RH, the dynamic contact angle was measured with a FIBRO DAT instrument in such a way that a 2 μL of ink droplet was dropped on a sheet of the Sharp NM4A2S paper, and the contact angle was measured; the initial contact angle (the value measured immediately after the arrival of the shot ink droplet at the surface of the recording medium) is denoted by $\theta_0$, and the contact angle after the elapsed time of 1 second from the arrival of the shot ink droplet is denoted by $\theta$, with $X=\theta-\theta_0$.

Additionally, $r_0$ denotes the initial dot radius, $r_t$ denotes the dot radius after the elapsed time of 10 seconds for the inks A and of 5 seconds for the inks B, and the dot area ratio $Y=r_t^2/r_0^2$.

Next, the prepared ink compositions A-1 to A-4 and B-1 to B-5 were subjected to the following items of evaluation tests described below in which the pattern for evaluation was printed on a sheet of a plain paper, Sharp NM4A2S, using an ink-jet printer (brand name: CL-700 (manufactured by Epson Corp.)) in the combinations specified in Examples 1-1 to 1-4 and Comparative Examples 1-1 to 1-9 listed in FIG. 3; (a) the evaluation of the color mixing (bleed) between the inks A and B, (b) the evaluation of the image blurring, and (c) the drying property test.

(a) The Evaluation of the Color Mixing (Bleed) between the Inks A and B

In the environment of 25° C. and 25 RH, a solid yellow printing was performed first with the ink A, and subsequently an alphabetical character was printed thereover with the ink B. After the elapsed time of 1 minute, the color mixing and blurring at the boundary between these two colors was evaluated by visual examination. The evaluation standards are as follows:

E . . . Ink splashing and color mixing scarcely occur, and the edges between the dots and two colors are extremely sharp.

G . . . Some ink splashing and color mixing occur, but the edges between the dots and two colors are sharp.

M . . . Ink splashing and color mixing are found in nearly all the dots, and the edges between the dots and two colors are somewhat fuzzy.

P . . . Ink splashing and color mixing are found in all the dots, and the edges between the dots and two colors are fuzzy.

(b) The Evaluation of the Image Blurring

In the environment of 25° C. and 25 RH, the image to be evaluated was printed with the seven colors of RGBCMYK, and after the elapsed time of 1 minute from the printing, the following evaluations were performed. The evaluation standards are as follows:

E . . . Blurring and feathering are scarcely observed, and the image quality is high.

G . . . Blurring and feathering are slightly observed, but the image quality is good as a whole.

M . . . Blurring and feathering are conspicuous, and the image quality is poor.

P . . . Blurring and feathering are extremely conspicuous, and the image quality is extremely poor.

(c) The Drying Property Test

In the environment of 25° C. and 25 RH, the image to be evaluated was printed, the image was scraped with a sheet of filter paper, and the evaluation was made on the basis of the time at which the printed portion was no more blotted. The evaluation standards are as follows:

G . . . Within 10 seconds

M . . . 10 seconds to 20 seconds

P . . . 20 seconds or longer

FIG. 3 shows the evaluation results for Examples 1-1 to 1-4 and Comparative Examples 1-1 to 1-9. As can be seen from these results, the larger is the dot area ratio Ya of the ink A, the better becomes the color bleed. This is because the larger is the Ya value, the faster is the ink penetration, and hence the dot printed first has been dried already when the following dot is shot, so that color bleed is suppressed. Additionally, the smaller is the dot area ratio Yb of the ink B, the better becomes the color mixing and blurring between the inks A and B. This is because the ink is not expanded after the printing so that the blurring and feathering ascribable to the penetration into paper scarcely occur. However, as can be seen from a comparison between Example 1-1 and Comparative Example 1-7, the color mixing and blurring between the inks A and B becomes worse, although the dot area ratio Yb of the ink B is small. This is because the dot area ratio Ya of the ink A is also small and the drying of the ink A is slow so that the ink A dot has not been sufficiently dried before the ink B droplet arrives to cause the color mixing.

As described above, it has been discovered that there can be obtained an ink set for use in the ink-jet recording which can achieve the reproduction of colors brilliant with scarce color bleed and is low in blurring, by combining the ink A with which printing is made first and which is large in the dynamic contact angle variation and in the dot area ratio with the ink B with which printing is made subsequently and which is small in the dynamic contact angle variation and in the dot area ratio.

Now, description is made on Examples in the present invention 2. First, the compositions of the inks used in Examples and Comparative Examples are shown below. Incidentally, the values given in % are represented in terms of the weights. Additionally, as for the compositions, the types and addition amounts of the dyes, solvents, and additives are as shown in FIG. 4; ion-exchanged water was added as the remainder so as to make the total quantity be 100. Incidentally, the inks C-1 to C-5 are the cyan-magenta-yellow color inks, where the used dyes are Direct Blue 199, Reactive Red 180, and Acid Yellow 23. The inks D-1 to D-6 are black inks, where the used dyes are Direct Black 19 or Food Black 2.

Each of the inks C-1 to C-5 was prepared as follows: the individual components of the ink shown in FIG. 4 were mixed, and stirred and mixed together at 25° C. for 1 hour, and then the mixture was subjected to the pressurized filtration with a membrane filter of 1.2 $\mu$m and to the degassing treatment.

The inks thus obtained were subjected to the dynamic contact angle measurement on a plain paper, Sharp NM4A2S, to obtain the initial contact angles and dot radii, and the time variations of the contact angles and dot radii after certain elapsed times, and the results obtained are shown in FIG. 5. Incidentally, the dynamic contact angle measurement was performed as follows: in an environment of 25° C. and 60% RH, the dynamic contact angle was measured with a FIBRO DAT instrument in such a way that a 2 $\mu$L of ink droplet was dropped on a sheet of the Sharp NM4A2S paper, and the contact angle θ was measured;

the initial contact angle (the value measured immediately after the arrival of the shot ink droplet at the surface of the recording medium) is denoted by $\theta_0$, and the contact angle after the elapsed time of 1 second from the arrival of the shot ink droplet is denoted by θ, with $X=\theta-\theta_0$.

Additionally, $r_0$ denotes the initial dot radius, $r_t$ denotes the dot radius after the elapsed time of 10 seconds for the inks C and of 5 seconds for the inks D, and the dot area ratio $Y=r_t^2/r_0^2$.

Next, the prepared ink compositions C-1 to C-5 and D-1 to D-6 were subjected to the following items of evaluation tests described below in which the pattern for evaluation was printed on a sheet of a plain paper, Sharp NM4A2S, using an ink-jet printer (brand name: CL-700 (manufactured by Epson Corp.)) in the combinations specified in Examples 2-1 to 2-5 and Comparative Examples 2-1 to 2-10 listed in FIG. 6; (a) the evaluation of the color mixing (bleed) between the inks C and D, (b) the evaluation of the image blurring, and (c) the drying property test.

(a) The Evaluation of the Color Mixing (Bleed) Between the Inks C and D

In the environment of 25° C. and 25 RH, a solid yellow printing was performed first with the ink C, and subsequently an alphabetical character was printed thereover with the ink D. After the elapsed time of 1 minute, the color mixing and blurring at the boundary between these two colors was evaluated by visual examination. The evaluation standards are as follows:

E . . . Ink splashing and color mixing scarcely occur, and the edges between the dots and two colors are extremely sharp.

G . . . Some ink splashing and color mixing occur, but the edges between the dots and two colors are sharp.

M . . . Ink splashing and color mixing are found in nearly all the dots, and the edges between the dots and two colors are somewhat fuzzy.

P . . . Ink splashing and color mixing are found in all the dots, and the edges between the dots and two colors are fuzzy.

(b) The Evaluation of the Image Blurring

In the environment of 25° C. and 25 RH, the image to be evaluated was printed with the seven colors of RGBCMYK, and after the elapsed time of 1 minute from the printing, the following evaluations were performed. The evaluation standards are as follows:

E . . . Blurring and feathering are scarcely observed, and the image quality is high.

G . . . Blurring and feathering are slightly observed, but the image quality is good as a whole.

M . . . Blurring and feathering are conspicuous, and the image quality is poor.

P . . . Blurring and feathering are extremely conspicuous, and the image quality is extremely poor.

(c) The Drying Property Test

In the environment of 25° C. and 25 RH, the image to be evaluated was printed, the image was scraped with a sheet of filter paper, and the evaluation was made on the basis of the time at which the printed portion was no more blotted. The evaluation standards are as follows:

G . . . Within 5 seconds

M . . . 5 seconds to 10 seconds

P . . . 10 seconds or longer

FIG. 6 shows the evaluation results for Examples 2-1 to 2-5 and Comparative Examples 2-1 to 2-10. As can be seen from these results, the larger is the dot area ratio Yc of the ink C, the better becomes the color bleed. This is because the larger is the Yc value, the faster is the ink penetration, and hence the dot printed first has been dried already when the following dot is shot, so that color bleed is suppressed. Additionally, the smaller is the dot area ratio Yd of the ink D, the better becomes the color mixing and blurring between the inks C and D. This is because the ink is not extended after the printing so that the blurring and feathering ascribable to the penetration into paper scarcely occur. However, as can be seen from a comparison between Example 2-1 and Comparative Example 2-7, the color mixing and blurring between the inks C and D becomes worse, although the dot area ratio Yd of the ink D is small. This is because the dot area ratio Yc of the ink C is also small and the drying of the ink C is slow so that the ink C dot has not been sufficiently dried until the ink D droplet arrives to cause the color mixing.

As described above, it has been discovered that there can be obtained an ink set for use in the ink-jet recording which can achieve the reproduction of brilliant colors with scarce color bleed and is low in blurring, by combining the ink C with which printing is made first and which is large in the dynamic contact angle variation and in the dot area ratio with the ink D with which printing is made subsequently and which is small in the dynamic contact angle variation and in the dot area ratio.

In the image recording apparatus and recording method based on a color ink-jet scheme in any of the present inventions 1 and 2, through the use of the two types of inks which are specified in the dynamic contact angle and in the dot area ratio, the reproduction of the colors brilliant with scarce color bleed can be achieved even on plain papers; high-quality color images low in blurring can be provided; and plain papers low in price can be used instead of special papers high in cost, yielding the effect leading to the low running cost.

According to the present invention, there can be obtained an image recording apparatus and recording method based on a color ink-jet scheme and an ink set which can achieve the reproduction of colors brilliant with scarce color bleed and is low in blurring even with high speed recording on plain papers when the ink set is used as the inks for use in the ink-jet recording.

What is claimed is:

1. An image recording apparatus based on a color ink-jet scheme provided with an ink set consisting of one or more than one colors of inks containing a color dye and water as the indispensable components and a black ink containing a black pigment and water as the indispensable components, and an ink-jet printing unit which performs printing with these inks on a plain paper having a degree of flatness and smoothness of 100 seconds or less, wherein:

the initial contact angles $\theta_0$ of the two colors of inks, namely, at least one color ink and the black ink of said ink set, fall within the range from 30 to 80° on the plain paper having a degree of flatness and smoothness of 100 seconds or less; as for one of said two colors of inks, the ink A, and the other ink, the ink B, the contact angle variation Xa of the ink A as obtained by the dynamic liquid absorption measurement after the elapsed time of 1 second falls within the range $-70<Xa<-10(°)$, the dot area ratio Ya of the ink A after the elapsed time of ta seconds falls in the range 1.5<Ya, the contact angle variation Xb of the ink B as obtained by the dynamic liquid absorption measurement after the elapsed time of 1 second falls within the range $-10<Xb<0(°)$, and the dot area ratio Yb of the ink B after the elapsed time of tb seconds falls within the range 1.0<Yb<1.5; and the ink-jet printing unit performs printing first with the ink A and subsequently with the ink B;

wherein the contact angle variation $X=\theta-\theta_0$, the dot area ratio $Y=r_t^2/r_0^2$, $0.1<ta\leq5$ (seconds), $0<tb\leq10$ (seconds), $\theta$ denotes the dynamic contact angle of the ink A or the ink B after the elapsed time of 1 second from the printing, and $r_0$ and $r_t$ denote respectively the radii of the dots at the time of printing with the ink A or the ink B and after the elapsed time of ta or tb seconds therefrom; incidentally, the liquid droplet volume in the dynamic liquid absorption measurement is 2 µL.

2. The image recording apparatus based on a color ink-jet scheme according to claim 1, wherein in said ink set, the black pigment in the black ink is a self-dispersing pigment.

3. The image recording apparatus based on a color ink-jet scheme according to claim 1, wherein in said ink set, at least one color of ink contains at least any one of a polyol or a polyol ether.

4. The image recording apparatus based on a color ink-jet scheme according to claim 3, wherein said polyol or polyol ether is selected from the group consisting of ethyleneglycol monoalkyl ethers, diethyleneglycol monoalkyl ethers, triethyleneglycol monoalkyl ethers, propyleneglycol monoalkyl ethers, dipropyleneglycol monoalkyl ethers, and alkoxy substituted aliphatic alcohol.

5. The image recording apparatus based on a color ink-jet scheme according to claim 1, wherein in said ink set, at least one color of ink contains a glycol based or an acetyleneglycol based surfactant.

6. The image recording apparatus based on a color ink-jet scheme according to claim 1, wherein in said ink set, the surface tension of at least one color of ink falls within the range from 20 to 70 mN/m.

7. The image recording apparatus based on a color ink-jet scheme according to claim 1, wherein in said ink set, the viscosity of at least one color of ink falls within the range from 1 to 20 mPa.S.

8. The image recording apparatus based on a color ink-jet scheme according to claim 1, wherein in said ink set, at least one color of ink contains as the fixing resin a water-soluble resin and/or an emulsion and/or a latex.

9. The image recording apparatus based on a color ink-jet scheme according to claim 1, wherein in said ink set, the ink A is a color ink and the ink B is a black ink.

10. An image recording apparatus based on a color ink-jet scheme provided with an ink set consisting of one or more than one colors of inks containing a color dye and water as the indispensable components and a black ink containing a black dye and water as the indispensable components, and an ink-jet printing unit which performs printing with these inks on a plain paper having a degree of flatness and smoothness of 100 seconds or less, wherein:

the initial contact angles $\theta_0$ of the two colors of inks, namely, at least one color ink and the black ink of said ink set, fall within the range from 30 to 80° on the plain paper having a degree of flatness and smoothness of 100 seconds or less; as for one of said two colors of inks, the ink C, and the other ink, the ink D, the contact angle variation Xc of the ink C as obtained by the dynamic liquid absorption measurement after the elapsed time of 1 second falls within the range $-70<Xc<-10(°)$, the dot area ratio Yc of the ink C after the elapsed time of tc seconds falls in the range 1.5<Yc, the contact angle variation Xd of the ink D as obtained by the dynamic liquid absorption measurement after the elapsed time of 1 second falls within the range $-15<Xd<0(°)$, and the dot area ratio Yd of the ink D after the elapsed time of td seconds falls within the range 1.0<Yd<1.7; and the ink-jet printing unit performs printing first with the ink C and subsequently with the ink D;

wherein the contact angle variation $X=\theta-\theta_0$, the dot area ratio $Y=r_t^2/r_0^2$, $0<tc\leq5$ (seconds), $0<td\leq10$ (seconds), $\theta$ denotes the dynamic contact angle of the ink C or the ink D after the elapsed time of 1 second from the printing, and $r_0$ and $r_t$ denote respectively the radii of the dots at the time of printing with the ink C or the ink D and after the elapsed time of tc or td seconds therefrom; incidentally, the liquid droplet volume in the dynamic liquid absorption measurement is 2 µL.

11. The image recording apparatus based on a color ink-jet scheme according to claim 10, wherein in said ink set, at least one color of ink contains at least any one of a polyol or a polyol ether.

12. The image recording apparatus based on a color ink-jet scheme according to claim 11, wherein said polyol or polyol ether is selected from the group consisting of ethyleneglycol monoalkyl ethers, diethyleneglycol monoalkyl ethers, triethyleneglycol monoalkyl ethers, propyleneglycol monoalkyl ethers, dipropyleneglycol monoalkyl ethers, and alkoxy substituted aliphatic alcohol.

13. The image recording apparatus based on a color ink-jet scheme according to claim 10, wherein in said ink set, at least one color of ink contains a glycol based or an acetylenegylcol based surfactant.

14. The image recording apparatus based on a color ink-jet scheme according to claim 10, wherein in said ink set, the surface tension of at least one color of ink falls within the range from 20 to 70 mN/m.

15. The image recording apparatus based on a color ink-jet scheme according to claim 10, wherein in said ink set, the viscosity of at least one color of ink falls within the range from 1 to 20 mPa.S.

16. The image recording apparatus based on a color ink-jet scheme according to claim 10, wherein in said ink set, at least one color of ink contains as the fixing resin a water-soluble resin and/or an emulsion and/or a latex.

17. The image recording apparatus based on a color ink-jet scheme according to claim 10, wherein in said ink set, the ink C is a color ink and the ink D is a black ink.

18. An image recording method based on a color ink-jet scheme which performs printing in the ink-jet scheme on a plain paper having a degree of flatness and smoothness of 100 seconds or less, with one or more than one colors of inks containing a color dye and water as the indispensable components and a black ink containing a black pigment and water as the indispensable components, wherein:

the initial contact angles $\theta_0$ of the two colors of inks, namely, at least one color ink and the black ink, fall within the range from 30 to 80° on the plain paper having a degree of flatness and smoothness of 100 seconds or less; as for one of said two colors of inks, the ink E, and the other ink, the ink F, the contact angle variation Xe of the ink E as obtained by the dynamic liquid absorption measurement after the elapsed time of 1 second falls within the range $-70<Xe<-10(°)$, the dot area ratio Ye of the ink E after the elapsed time of te seconds falls in the range 1.5<Ye, the contact angle variation Xf of the ink F as obtained by the dynamic liquid absorption measurement after the elapsed time of 1 second falls within the range $-10<Xf<0(°)$, and the dot area ratio Yf of the ink F after the elapsed time of tf seconds falls within the range 1.0<Yf<1.5; and printing is performed first with the ink E and subsequently with the ink F;

wherein the contact angle variation $X=\theta-\theta_0$, the dot area ratio $Y=r_t^2/r_0^2$, $0.1<te\leq5$ (seconds), $0<tf\leq10$ (seconds), $\theta$ denotes the dynamic contact angle of the ink E or the ink F after the elapsed time of 1 second from the printing, and $r_0$ and $r_t$ denote respectively the radii of the dots at the time of printing with the ink E or the ink F and after the elapsed time of te or tf seconds therefrom; incidentally, the liquid droplet volume in the dynamic liquid absorption measurement is 2 µL.

19. An image recording method based on a color ink-jet scheme which performs printing in the ink-jet scheme on a plain paper having a degree of flatness and smoothness of 100 seconds or less, with one or more than one colors of inks containing a color dye and water as the indispensable components and a black ink containing a black dye and water as the indispensable components, wherein:

the initial contact angles $\theta_0$ of the two colors of inks, namely, at least one color ink and the black ink, fall within the range from 30 to 80° on the plain paper having a degree of flatness and smoothness of 100 seconds or less; as for one of said two colors of inks, the ink G, and the other ink, the ink H, the contact angle variation Xg of the ink G as obtained by the dynamic liquid absorption measurement after the elapsed time of 1 second falls within the range $-70<Xg<-10(°)$, the dot area ratio Yg of the ink G after the elapsed time of tg seconds falls in the range 1.5<Yg, the contact angle variation Xh of the ink H as obtained by the dynamic liquid absorption measurement after the elapsed time of 1 second falls within the range $-15<Xh<0(°)$, and the dot area ratio Yh of the ink H after the elapsed time of th seconds falls within the range 1.0<Yh<1.7; and printing is performed first with the ink G and subsequently with the ink H;

wherein the contact angle variation $X=\theta-\theta_0$, the dot area ratio $Y=r_t^2/r_0^2$, $0<tg\leq5$ (seconds), $0<th\leq10$ (seconds), $\theta$ denotes the dynamic contact angle of the ink G or the ink H after the elapsed time of 1 second from the printing, and $r_0$ and $r_t$ denote respectively the radii of the dots at the time of printing with the ink G or the ink H and after the elapsed time of tg or th seconds therefrom; incidentally, the liquid droplet volume in the dynamic liquid absorption measurement is 2 µL.

20. An ink set for use in the ink-jet recording which is composed of a combination of one or more than one colors of inks containing a color dye and water as the indispensable components and a black ink containing a black pigment and water as the indispensable components, wherein:

the initial contact angles $\theta_0$ of the two colors of inks, namely, at least one color ink I and the black ink J, fall within the range from 30 to 80° on a plain paper having a degree of flatness and smoothness of 100 seconds or less; and the contact angle variation Xi of the color ink I as obtained by the dynamic liquid absorption measurement after the elapsed time of 1 second falls within the range $-70<Xi<-10(°)$, the dot area ratio Yi of the color ink I after the elapsed time of ti seconds falls in the range 1.5<Yi, the contact angle variation Xj of the black ink J as obtained by the dynamic liquid absorption measurement after the elapsed time of 1 second falls within the range $-10<Xj<0(°)$, and the dot area ratio Yj of the black ink J after the elapsed time of tj seconds falls within the range 1.0<Yj<1.5;

wherein the contact angle variation $X=\theta-\theta_0$, the dot area ratio $Y=r_t^2/r_0^2$, $0.1<ti\leq5$ (seconds), $0<tj\leq10$ (seconds), $\theta$ denotes the dynamic contact angle of the color ink I or the black ink J after the elapsed time of 1 second from the printing, and $r_0$ and $r_t$ denote respectively the radii of the dots at the time of printing with the color ink I or the black ink J and after the elapsed time of ti or tj seconds therefrom; incidentally, the liquid droplet volume in the dynamic liquid absorption measurement is 2 µL.

21. An ink set for use in the ink-jet recording which is composed of a combination of one or more than one colors of inks containing a color dye and water as the indispensable components and a black ink containing a black dye and water as the indispensable components, wherein:

the initial contact angles $\theta_0$ of the two colors of inks, namely, at least one color ink K and the black ink L, fall within the range from 30 to 80° on a plain paper having a degree of flatness and smoothness of 100 seconds or less; and the contact angle variation Xk of the color ink K as obtained by the dynamic liquid absorption measurement after the elapsed time of 1 second falls within the range $-70<Xk<-10$(°) the dot area ratio Yk of the color ink K after the elapsed time of tk seconds falls in the range 1.5<Yk, the contact angle variation Xl of the black ink L as obtained by the dynamic liquid absorption measurement after the elapsed time of 1 second falls within the range $-15<Xl<0$(°), and the dot area ratio Yl of the ink L after the elapsed time of tl seconds falls within the range 1.0<Yl<1.7;

wherein the contact angle variation $X=\theta-\theta_0$, the dot area ratio $Y=r_t^2/r_0^2$, $0<tk\leq 5$ (seconds), $0<tl\leq 10$ (seconds), $\theta$ denotes the dynamic contact angle of the color ink K or the black ink L after the elapsed time of 1 second from the printing, and $r_0$ and $r_t$ denote respectively the radii of the dots at the time of printing with the ink K or the ink L and after the elapsed time of tk or tl seconds therefrom; incidentally, the liquid droplet volume in the dynamic liquid absorption measurement is 2 µL.

\* \* \* \* \*